(12) United States Patent
Kobayashi et al.

(10) Patent No.: US 9,359,718 B2
(45) Date of Patent: Jun. 7, 2016

(54) AQUEOUS SOLUTION COMPOSITION

(75) Inventors: Nobuyuki Kobayashi, Chuo-ku (JP);
Shinya Tsuchida, Chuo-ku (JP);
Takanori Sannan, Chuo-ku (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 272 days.

(21) Appl. No.: 12/448,801

(22) PCT Filed: Dec. 27, 2007

(86) PCT No.: PCT/JP2007/075111
§ 371 (c)(1),
(2), (4) Date: Jul. 8, 2009

(87) PCT Pub. No.: WO2008/087845
PCT Pub. Date: Jul. 24, 2008

(65) Prior Publication Data
US 2010/0062262 A1  Mar. 11, 2010

(30) Foreign Application Priority Data
Jan. 16, 2007  (JP) .................. 2007-006609

(51) Int. Cl.
| | | |
|---|---|---|
| B32B 17/06 | (2006.01) | |
| B32B 23/04 | (2006.01) | |
| D06M 15/03 | (2006.01) | |
| C08K 5/09 | (2006.01) | |
| C08L 5/08 | (2006.01) | |
| C09D 105/08 | (2006.01) | |
| D06M 13/207 | (2006.01) | |
| D21H 17/24 | (2006.01) | |

(52) U.S. Cl.
CPC .......... *D06M 15/03* (2013.01); *C08K 5/09* (2013.01); *C08L 5/08* (2013.01); *C09D 105/08* (2013.01); *D06M 13/207* (2013.01); *D21H 17/24* (2013.01); *Y10T 428/31678* (2015.04); *Y10T 428/31975* (2015.04)

(58) Field of Classification Search
None
See application file for complete search history.

(56) References Cited

U.S. PATENT DOCUMENTS

| 4,409,204 A | 10/1983 | Lang et al. | |
|---|---|---|---|
| 2001/0008875 A1 | 7/2001 | House | |
| 2003/0001937 A1* | 1/2003 | Landry-Coltrain et al. | 347/100 |
| 2003/0135172 A1* | 7/2003 | Whitmore et al. | 604/359 |
| 2004/0092620 A1* | 5/2004 | Kobayashi et al. | 523/122 |
| 2004/0234575 A1 | 11/2004 | Horres et al. | |
| 2005/0176678 A1 | 8/2005 | Horres et al. | |
| 2007/0196404 A1* | 8/2007 | Howard et al. | 424/402 |
| 2011/0009955 A1 | 1/2011 | Horres et al. | |

FOREIGN PATENT DOCUMENTS

| JP | 4-253705 A | 9/1992 |
|---|---|---|
| JP | 10-296208 A | 11/1998 |
| JP | 11-247067 A | 9/1999 |
| JP | 2001-172674 A | 6/2001 |
| JP | 2001-172678 A | 6/2001 |
| JP | 2003-206409 A | 7/2003 |
| JP | 2003-239197 A | 8/2003 |
| JP | 2003-335053 A | 11/2003 |
| JP | 2005-534724 A | 11/2005 |
| JP | 2009-514711 A | 4/2009 |
| WO | 2005/007097 A1 | 8/2005 |
| WO | WO 2007/056349 A1 | 5/2007 |

OTHER PUBLICATIONS

Tsuchida et al., JP 2003-239197 machine translation, Aug. 27, 2003.*
Muzzarelli et. al., Carbohydr Res 107:199-214 (1982)—N-carboxymethylidene)chitosans and N-(carboxymethyl)-chitosans: Noel Chelating polyampholytes obtained from chitosan glyoxylate.*
Miranda et al., Chitosan and N-carboxymethylchitosan: I. The role of N-carboxymethylation of chitosan in the thermal stability and dynamic mechanical properties of its films, Jun. 8, 2006.*
Habibi et al., Polysaccharide building blocks. p. 127-128 and 178-179, 2012.*
Chemical Book, 298-12-4(Glyoxylic acid) Product Description, 2007. http://www.chemicalbook.com/ChemicalProductProperty_US_CB9455362.aspx.*
Japan Patent Office, Office Action in Japanese Patent Application No. 2007-336040, Jan. 31, 2012.
European Patent Office, Extended European Search Report for European Patent Application No. 07 86 0333, Apr. 24, 2013, Munich, Germany.
Muzzarelli, R. A. A., et al., "Solubility and Structure of N-Carboxymethylchitosan," International Journal of Biological Macromolecules, vol. 16, No. 4, Jan. 1, 1994, pp. 177-180.

* cited by examiner

*Primary Examiner* — Coris Fung
(74) *Attorney, Agent, or Firm* — Hamre, Schumann, Mueller & Larson, P.C.

(57) ABSTRACT

This invention relates to a composition characterized by containing, as essential components, deacetylated chitin and/or a deacetylated chitin derivative, and glyoxylic acid; a solution-containing gel formed from the composition; a water-insoluble chitosan coating; and a material obtained by treating a base material with the composition. According to the present invention, it is possible to provide a chitosan composition, which in a "one-pack" form, has a pot life. Even when dried at room temperature after coating or impregnation of a base material, the chitosan coating can be water-insolubilized with reduced yellowing.

4 Claims, No Drawings

AQUEOUS SOLUTION COMPOSITION

TECHNICAL FIELD

This invention relates to an aqueous solution composition (which may hereinafter be simply called "composition") containing deacetylated chitin and/or a deacetylated chitin derivative (both of which will hereinafter be called "chitosan", and the term "chitosan" includes derivatives of chitosan), and more specifically, relates to a composition containing chitosan and glyoxylic acid as essential components, a solution-containing gel formed from the composition, a water-insoluble chitosan coating, and a material obtained by treating a base material with the composition.

BACKGROUND ART

Chitin and chitosan have been attracting interests as naturally-occurring functional polysaccharides, and have found utility in a variety of fields. Chitin and chitosan are common names, and there is no officially-unified definition that clearly distinguishes them from each other. In the present invention, a polysaccharide composed solely of N-acetylglucosamine will be called "chitin", and a polysaccharide composed of N-acetylglucosamine and glucosamine in combination or composed solely of glucosamine will be called "chitosan". Chitosan is known to be found in nature, and is also one of a few aminopolysaccharides which are produced industrially. Functions originated from its amino groups, for example, its absorptive ability for acidic substances and the resulting cationic property are utilized in a multiplicity of fields. Specifically, those obtained by combining chitosan and fibers together by various methods are marketed as antimicrobial anti-odor fibers.

One of most convenient methods for combining fibers and chitosan together is to coat or impregnate fibers or a fibrous product with a slightly acidic aqueous solution of chitosan and then to dry the coated or impregnated fibers or fibrous product. Through treatment by this method, an antimicrobial anti-odor function can be imparted to the fiber product. According to this treatment, however, the chitosan applied to the fibers has not been water-insolubilized, so that the chitosan is readily eliminated from the fibers by washing and no washing fastness can be assured for so-called chitosan-treated fibers. Not only for the assurance of washing fastness for chitosan but also for the utilization of chitosan, it is hence an important key technology to water-insolubilize chitosan as desired. A variety of methods have, therefore, been attempted with a view to water-insolubilizing chitosan.

For example, it has been attempted to insolubilize chitosan by coating or impregnating a suitable base material with an aqueous solution, in which chitosan is dissolved as a salt (chitosan salt) of chitosan and an acid as a result of addition of chitosan to an acidic aqueous solution, drying the thus-coated or impregnated base material, and then neutralizing the acid with an aqueous solution of an alkali such as caustic soda or sodium bicarbonate to liberate water-insoluble chitosan or by treating a chitosan salt, with which a base material has been coated or impregnated, with a solution of an anionic polymer such as alginic acid or carboxymethylcellulose to form a polyionic complex of chitosan and the anionic polymer. By these methods, a chitosan salt can be water-insolubilized. However, a coating formed of the resulting chitosan is not sufficient in strength, and moreover, the treatment is not a one-solution treatment but a two-solution treatment. The above-described treatment process becomes long. Accordingly, these methods are also disadvantageous from the standpoint of treatment cost. With respect to the water insolubilization of chitosan with crosslinking agents, various methods have also been attempted.

It is to be noted that the term "one-solution" or "one-pack" as used herein means to form a coating with only one kind of chitosan solution while the term "two-solution" as used herein means to form a chitosan coating by using a chitosan solution and another solution, which insolubilizes chitosan (the above-described alkali solution, anionic polymer solution, crosslinking agent solution, or the like), upon formation of the coating.

For example, Patent Document 1 discloses a technology that water-insolubilizes amino-containing chitosan by crosslinking it with a polyethylene glycol derivative containing glycidyl ether groups, and Patent Document 2 describes a technology that water-insolubilizes water-soluble chitosan by crosslinking it with a water-soluble urethane prepolymer containing carbamoyl sulfonate groups at molecule ends. These technologies both require heat treatment at 150° C. or so upon formation of a coating, and therefore, cannot be used in applications in which no high-temperature treatment can be conducted, such as treatment of heat-sensitive paper.

On the other hand, a mixed solution prepared by mixing a dialdehyde compound such as glyoxal or glutaraldehyde in a chitosan salt solution can obtain a water-insoluble coating even by room-temperature drying, to say nothing of heated drying, after coating or impregnation of a base material. Although the mixed solution is in the form of a "single pack", this "single-pack" solution has a short pot life (useful lifetime). A limitation is thus imposed on its use. More importantly, crosslinked chitosan coatings formed using these dialdehydes unavoidably undergo severe yellowing with time. There is, accordingly, an outstanding desire for the development of a "single-pack" type chitosan solution that can form a crosslinked chitosan coating with reduced yellowing tendency.

As one of methods for insolubilizing a chitosan coating obtainable from a chitosan solution which is a "single pack" form and is provided with improved pot life performance, the present inventors disclosed that an aqueous solution of chitosan and a polybasic acid remains stable as a "one-pack" solution at room temperature over a long term and also that, when subjected to heat treatment at 150° C. or higher after once a base material is coated or impregnated with the aqueous solution and then dried, the resulting chitosan coating becomes water-insoluble (Patent Document 3). This method can obtain a chitosan coating having excellent waterproofness by heating treatment, but in room-temperature (low-temperature) drying, no chitosan coating can be obtained with excellent waterproofness by this method.

As described above, there has been a desire for the development of a chitosan composition which has a pot life in a "one-pack" form, can water-insolubilize a chitosan coating even by room-temperature drying after coating or impregnation of a base material, and can form a chitosan coating having reduced yellowing tendency.

Patent Document 1: JP-A-11-247067
Patent Document 2: JP-A-4-253705
Patent Document 3: JP-A-2003-206409

DISCLOSURE OF THE INVENTION

Problem to be Solved by the Invention

With the foregoing problem in view, the present invention has as objects thereof the provision of a chitosan composition, which has a pot life in a "one-pack" form, can water-insolubilize a chitosan coating even by room-temperature drying after coating or impregnation of a base material, and can form a chitosan coating having reduced yellowing tendency; a solution-containing gel formed from the composition; a water-insoluble chitosan coating; and a material obtained by treating with the composition.

Means for Solving the Problem

The present inventors have carried out enthusiastic research to achieve the above-mentioned objects. As a result, it has been found that a composition, which contains chitosan and glyoxylic acid as essential components, is excellent in pot life as a "single-pack" solution and can form a water-insolubilized chitosan coating even by room-temperature drying without needing high-temperature drying after once a base material is coated or impregnated with the composition, leading to the completion of the present invention.

Described specifically, the present invention provides a composition comprising chitosan and glyoxylic acid as essential components.

In the above-described composition, it is preferred that the content of chitosan is not higher than 30 wt %; that the content of glyoxylic acid is from 0.1 to 3 times by weight that of chitosan; that chitosan contains at least one amino group in a molecule; that the composition further comprises at least one acidic component in addition to glyoxylic acid; and that the acidic component has dissolving ability for chitosan.

The present invention also provides a solution-containing gel formed from the composition according to the present invention; a water-insoluble chitosan coating obtained by drying the composition according to the present invention; and a composite material prepared by treating a base material with the composition according to the present invention and water-insolubilizing chitosan.

The base material can be, for example, a platy, foil-shaped, spongy, fibrous or three-dimensional, formed product, the material of which can be metal, glass, ceramics, concrete, paper, resin, wood, organic polymer or inorganic polymer.

Advantageous Effects of the Invention

According to the present invention, there can be provided a composition, which is excellent in pot life as a "single-pack" solution and can form a water-insolubilized chitosan coating even by room-temperature drying without needing high-temperature drying after once a base material is coated or impregnated with the composition; a solution-containing gel formed from the composition; a water-insoluble chitosan coating; and a material obtained by treating a base material with the composition.

Best Modes for Carrying Out the Invention

The present invention will next be described in further detail based on preferred embodiments. Based on the conventional investigations, the present inventors proceeded with a further investigation. As a result, the present inventors have developed a new technology for the water insolubilization of chitosan coatings, which cannot be realized by the conventional water insolubilization technologies for chitosan coatings by high-temperature heating.

The composition according to the present invention can form a water-insoluble chitosan coating without heating after coating or impregnating a base material with the solution, and at the same time, can suppress the coloration of the chitosan coating. In the composition according to the present invention, chitosan and glyoxylic acid are dissolved as essential components in an aqueous medium (the term "aqueous medium" as used herein means to comprise water as a primary solvent and to optionally contain an organic solvent further).

The term "deacetylated chitin (chitosan)" for use in the present invention means a polysaccharide composed of N-acetylglucosamine and glucosamine in combination or glucosamine alone, and also includes chitosan derivatives chemically modified using the chitosan as raw materials. These chitosans can be used either solely or as mixtures.

Chitosan is generally soluble in an acidic aqueous solution, but is not soluble in water. Chitin is a natural functional high-molecular substance known to be found as a constituent element of fungal cell walls. Industrially, chitin can be obtained from the exoskeletons or the like of crustaceans such as crabs or lobsters by removing ash such as calcium through hydrochloric acid treatment and proteins through alkali treatment. Chitosan is produced by further subjecting chitin to deacetylation. These production processes both rely upon heterogeneous reactions, each of which does not include any step that dissolves chitosan.

Chitin contains N-acetyl-D-glucosamine as primary units, while chitosan contains D-glucosamine as primary units and also contains N-acetyl-D-glucosamine units to some extent in most instances. In the present invention, no limitation is imposed on their percentages, and both chitosans are usable.

The above-described chitosans themselves have already been produced industrially, and are available in various grades from the market. These known chitosans are all usable in the present invention. No particular limitation is imposed on the deacetylation degree and polymerization degree of chitosan. Depending on the application, an optimal chitosan can be chosen as desired.

Describing about the deacetylation degree of chitosan, chitosan the deacetylation degree of which is 25 mol % or higher is preferred in the present invention, with one having a deacetylation degree of from 40 to 100 mol % being more preferred when the readiness of synthesis of a chitosan derivative is taken into consideration. The deacetylation degree of chitosan can be measured by the conventionally-known colloidal titration.

(Measurement Method of Deacetylation Degree)

The deacetylation degree of chitosan can be calculated from a titrated amount measured by the colloid titration. Described specifically, by using a toluidine blue solution as an indicator and conducting colloid titration with an aqueous solution of potassium polyvinylsulfate, free amino groups in chitosan molecules are quantified to determine the deacetylation degree of chitosan. The preparation of samples and titration tests in the present invention, which will be described hereinafter, were conducted at room temperature of approx. 20° C.

(Sample Preparation and Titration Test in the Measurement of Deacetylation Degree)

A predetermined amount of chitosan is added to a 0.5 wt % aqueous solution of acetic acid to obtain a premix, the pure chitosan concentration of which is 0.5 wt %, as much as precisely 100 g, followed by stirring to dissolve the chitosan. The premix (10 g) and deionized water (90 g) are next weighed precisely, and are stirred and mixed to prepare a 0.05 wt % chitosan solution. Further, an aliquot (10 g) of the 0.05 wt % chitosan solution is precisely weighed, into which deionized water (50 mL) and the toluidine blue solution (approx. 0.2 mL) are added, followed by the titration of free amino groups with a potassium polyvinylsulfate solution (N/400 PVSK). The titration rate is controlled at from 2 mL/min to 5 m/min. A titrated amount at which the color of the measurement solution is retained for 30 seconds or longer subsequent to a change of the color from blue to reddish purple is read as a titrated amount at an end point.
(Blank Test)

Using deionized water in place of the premix employed in the above-described titration test, a similar titration test is conducted.
(Calculation Method)

$$X = 1/400 \times 161 \times f \times (V-B)/1000 = 0.4025 \times f \times (V-B)/1000$$

$$Y = 0.5/100 - X$$

X: Weight of free amino groups in chitosan (equivalent to the weight of glucosamine residues)
Y: Weight of bound amino groups in chitosan (equivalent to the weight of N-acetylglucosamine residues)
f: Titer of N/400 PVSK
V: Titrated amount for sample (mL)
B: Titrated amount in blank test (mL)

$$\text{Deacetylation degree (mol \%)} = \text{(free amino groups)}/\{\text{(free amino groups)} + \text{(bound amino groups)}\} \times 100 = (X/161)/(X/161 + Y/203) \times 100$$

It is to be noted that 161 is the equivalent molecular weight of glucosamine residues and 203 is the equivalent molecular weight of N-acetylglucosamine residues.

Further, the following method is effective especially for the measurement of the deacetylation degree of chitosan the acetylation degree of which is low. For example, chitosan is hydrolyzed with p-toluenesulfonic acid, liberated acetic acid is absorbed in iodine, and the remaining iodine is titrated with sodium thiosulfate to determine the number (m) of moles of the acetic acid. This number (m) is also the number of moles of N-acetylglucosamine units in chitosan. Assuming that the number of moles of glucosamine units in chitosan is (n), the following formulas can be derived:

$$n = (\text{Weight of chitosan} - 203\ m)/161$$

$$\text{Deacetylation degree (mol \%)} = n/(m+n) \times 100$$

The above-described analysis is basically conducted following the EKEK and HARTE iodimetric procedure (Ind. Eng. Chem., Anal. Ed. 8(4), 267 (1936)). However, chitosan is high in hygroscopicity so that its precise weighing is difficult. An analysis is, therefore, conducted by making combined use of the contrivance to be described hereinafter.

Chitosan is predried under reduced pressure at 60° C. for 24 hours in a vacuum dryer. On the side, a "PYLEX" (registered trademark) glass tube is fused and closed at an end thereof, and the end is then blown to prepare a cartesian diver. Its size should be adjusted such that it can be inserted into glass vessels to be used in subsequent analyses. Provided is a polypropylene-made cap which can hermetically close an open end of the cartesian diver (the cap should be ascertained to be free of any substance that may cause a problem in the subsequent analyses). The cartesian diver and cap are predried under reduced pressure at 60° C. for 24 hours in the vacuum dryer and are then brought to a constant weight in a manner known per se in the art by using a desiccator with a desiccant agent placed therein, and their weight (A weight part) is measured. Next, chitosan is placed in the cartesian diver, and is dried together with the cap under reduced pressure at 60° C. for 24 hours in the vacuum dryer while holding the cartesian diver upright with the open end of the cartesian diver being maintained open. Subsequently, the reduced pressure is slowly cancelled, and the cartesian diver and cap are dried under environmental pressure at 105° C. for 2 hours.

The dryer is then opened, and within the dryer, the open end of the cartesian diver is promptly closed by the polypropylene-made cap. The capped cartesian diver is allowed to cool down in the desiccator, and its weight (B weight part) is measured.

Next, the cartesian diver is uncapped, and is placed in a glass flask for hydrolysis by the EKEK and HARTE iodimetric procedure. Subsequently, a glass rod is downwardly inserted into the glass flask. After the inflated portion of the cartesian diver in the flask is broken, the glass rod is washed with a small amount of distilled water in the flask and is then taken out of the flask. Following the EKEK and HARTE iodimetric procedure, a dropping funnel, a condenser, a catch receptacle and a decompression line are fitted, and reagents other than chitosan are charged. For the sake of assurance, the hydrolysis time is set at 5 hours. Subsequently, the absorption of the resultant acetic acid into an iodine solution and the titration of the iodine solution with sodium thiosulfate were conducted. From the titrated amount, the number (m) of moles of the acetic acid was determined. Using this number and the weight of the charged chitosan (B−A), the deacetylation degree is calculated in accordance with the above-described formulas.

In the present invention, it is preferred to use, as the chitosan, chitosan whose 1 wt % aqueous solution in acetic acid has a viscosity of from 1 mPa·s to 10,000 mPa·s. Specifically describing a viscosity measurement, the viscosity measurement was conducted by using a B-type rotational viscometer with a rotator selected to permit the measurement under the condition of 30 rpm while maintaining an aqueous acetic acid solution, which has been prepared to give a pure chitosan concentration of 1 wt %, at 20° C. in a constant-temperature chamber. The term "pure" as used herein means an equivalent solid content of a chitosan sample, and specifically, a solid content determined by drying the chitosan sample at 105° C. for 2 hours.

A viscosity lower than 1 mPa·s cannot provide the resulting chitosan coating with effective properties subsequent to its water insolubilization, while with chitosan the viscosity of which is higher than 10,000 mPa·s, the viscosity is so high that the handling of a chitosan solution and the water insolubilization treatment become insufficient. Accordingly, more preferred from the standpoint of effectively obtaining the useful properties and reactivity of chitosan is chitosan having a deacetylation degree of from 40 mol % to 100 mol % and a viscosity of from 2 mPa·s to 1,000 mPa·s in the form of an aqueous solution in which the chitosan is contained at 1 wt %.

The chitosan derivatives useful in the present invention are derivatives which can be obtained by using the above-described chitosan as a raw material and chemically modifying the chitosan by a conventionally-known method. Illustrative of the chitosan derivatives are alkylated derivatives, allylated derivatives, acylated derivatives, sulfated derivatives, phosphatized derivatives and the like of chitosan. Specific examples include derivatives obtained by introducing, to hydroxyl groups and/or amino groups of chitosan as a starting material, alkyl groups such as methyl groups and ethyl groups, hydroxyalkyl groups such as hydroxyethyl groups, hydroxypropyl groups, hydroxybutyl groups and dihydroxypropyl groups, carboxyalkyl groups such as carboxymethyl groups and carboxyethyl groups, carboxyacyl groups such as succinyl groups, itaconoyl groups, maleoyl groups, glutaroyl groups and phthaloyl groups, hydroxyacyl groups such as glycoloyl groups and lactoyl groups, thioacyl groups such as thioglycoloyl groups, sulfate groups, and phosphate groups, either singly or in combination.

Also included are compounds obtained by adding vinyl compounds such as acrylic acid, methacrylic acid, acrylamide, acrylate esters and acrylonitrile to hydroxyl groups and/or amino groups of chitosan, and compounds obtained by reacting aldehyde compounds, which include formaldehyde, acetaldehyde, glyoxylic acid and reduced saccharides such as lactose, dextran, D-glucose, D-glucosamine and cellobiose, with hydroxyl groups and/or amino groups of chitosan to form Schiff's base groups and then reducing the Schiff's base groups with sodium borocyanohydride or the like.

Further included are urea derivatives and thiourea derivatives obtained by reacting cyanic acid and thiocyanic acid with hydroxyl groups and/or amino groups of chitosan, and compounds obtained by reacting, with hydroxyl groups and/or amino groups of chitosan, diallydimethylammonium halides, 2-chloroethyldiethylamine and their hydrochlorides, 3-chloro-2-hydroxypropyldiethylamine, 2,3-epoxypropyldimethylamine, 3-chloro-2-hydroxypropyltrimethylammonium chloride and 2,3-epoxypropyltrimethylammonium chloride.

Exemplified by common names, still further included are methyl chitosan, ethyl chitosan, hydroxyethyl chitosan, hydroxypropyl chitosan, hydroxybutyl chitosan, hydroxypropylhydroxybutyl chitosan, dihydroxypropyl chitosan, 2-hydroxypropyldiethylamine chitosan, 2-hydroxypropyltrimethylammonium chloride chitosan, carboxymethyl chitosan, carboxyethyl chitosan, carboxybutyl chitosan, succinylcarboxymethyl chitosan, succinylchitosan, itaconoylchitosan, maleoylchitosan, acetylthiosuccinoyl chitosan, glutaroyl chitosan, phthaloyl chitosan, glycoloyl chitosan, lactoyl chitosan, methylglycoloyl chitosan, thioglycoloyl chitosan, cyanoethyl chitosan, and their salts; and their copolymers.

The concentration of chitosan in the composition according to the present invention may preferably be 0.1 wt % or higher. A chitosan concentration lower than 0.1 wt % can hardly provide the resulting chitosan coating with effective properties after its solidification or water insolubilization. On the other hand, the chitosan concentration may preferably be 30 wt % or lower because one of the applications of the composition according to the present invention is coating onto base materials. At a concentration higher than this level, the composition is provided with an excessively high viscosity, and therefore, is inferior in coating applicability.

With glyoxylic acid contained in the composition according to the present invention, the resulting chitosan coating insolubilized with the glyoxylic acid undergoes less yellowing compared with conventionally-known crosslinking agents, for example, polyaldehydes such as glyoxal and glutaraldehyde.

Because each primary amino group in chitosan takes a strong part in the water insolubilization of chitosan, the chitosan for use in the present invention may preferably contain at least one primary amino group in a molecule.

As a solvent useful in the composition according to the present invention, water and/or a water-soluble organic solvent can be used, and its kind and weight ratio can be determined depending on the application purpose of the resulting composition. It is preferred to choose a suitable mixing ratio of water and the organic solvent by taking into consideration, for example, the hydrophilicity/hydrophobicity of each component contained in the composition, the preparation method of the composition, the environment of the drying treatment in the water insolubilization of chitosan, the waterproofness of a base material, and the storage, transportation, safety and the like of the composition. When a mixture of water and an organic solvent, especially an alcohol is used, the content of water contained in the composition may be set preferably at 40 wt % or higher from the standpoint of safety.

The content of glyoxylic acid in the composition according to the present invention may preferably be 0.1 to 3 times by weight that of the chitosan, and further, the composition according to the present invention may also contain an acidic component other than glyoxylic acid, an alkaline component, a salt or the like for pH adjustment, solution viscosity adjustment, or a like purpose. No particular limitation is imposed on the amount of such other component. For example, its use in an amount ranging from 0.01 to 20 times by weight the amount of glyoxylic acid is preferred from the standpoint of maintaining the stability of the composition.

Upon dissolution of chitosan, the aqueous medium may be heated or cooled to increase the solubility of chitosan in the aqueous medium. For suppressing the coloration of the treated base material as the object of the present invention, it is desired to finally adjust the pH of the composition according to the present invention to 2 or higher. At a pH lower than 2, coloration may be observed with time on the composition itself or on the base material treated with the composition (the composite material).

As an acidic component other than glyoxylic acid described above, it is possible to use an organic acid or inorganic acid having solubility in an aqueous medium. Examples include organic acids such as formic acid, acetic acid, propionic acid, butyric acid, taurine, pyrrolidonecarboxylic acid, citric acid, malic acid, lactic acid, hydroxymalonic acid, malonic acid, succinic acid, adipic acid, benzoic acid, salicylic acid, aminobenzoic acid, phthalic acid, cinnamic acid, trichloroacetic acid, and vitamin C; and inorganic acids such as hydrochloric acid, phosphoric acid, nitric acid, and sulfuric acid. At least one of these acids can be used.

Further, the alkaline substance useful for the pH adjustment or the like of the composition according to the present invention can be a conventionally-known alkali metal hydroxide or carbonate, ammonia, or amine. Examples include lithium hydroxide, sodium hydroxide, potassium hydroxide, sodium carbonate, sodium hydrogencarbonate, potassium carbonate, ammonia, morpholine, N-methylmorpholine, trimethylamine, triethylamine, ethanolamine, diethanolamine, triethanolamine, propanolamine, dipropanolamine, tripropanolamine, N-methylethanolamine, N,N-dimethylethanolamine, N-ethylethanolamine, N,N-diethylethanolamine, N-methyldiethanolamine, N-ethyldiethanolamine, N-methylpropanolamine, N,N-dimethylpropanolamine, aminomethylpropanol, and the like. At least one of these alkaline substances is used.

Salts which can be added to the composition according to the present invention are salts soluble insolvents, for example, inorganic salts such as alkali metal salts, alkaline earth metal salts and inorganic ammonium salts, and organic salts such as sulfonium salts, oxonium salts and organic ammonium salts. Typical examples of these salts include sodium carbonate, potassium carbonate, lithium carbonate, magnesium carbonate, sodium hydrogencarbonate, sodium chloride, potassium chloride, lithium chloride, magnesium chloride, ammonium chloride, sodium sulfate, sodium dihydrogenphosphate, potassium dihydrogenphosphate, sodium bromide, potassium bromide, sodium iodide, potassium iodide, tetrabutylammonium iodide, tetrabutylammonium hydroxide, sodium methoxide, potassium methoxide, sodium hydroxide, potassium hydroxide, sodium nitrate, potassium nitrate, sodium tartrate, sodium lactate, sodium acetate, sodium methanesulfonate, sodium citrate, and borax. No particular limitation is imposed on the amount (concentration) of the salt, and therefore, the salt can be added in such an amount (at such a concentration) that appropriate conditions can be imparted.

An aqueous medium usable in the composition according to the present invention can generally be water or a mixed solvent of water and a water-soluble organic solvent. As the water, distilled water, deionized water, tap water or the like can be chosen, for example. As the organic solvent, there can be mentioned a ketone such as acetone or methyl ethyl ketone, an alcohol such as methanol, ethyl alcohol or isopropyl alcohol, or a water-soluble organic solvent such as N-methylpyrrolidone, dimethylsulfoxide, N,N-dimethylformamide, dimethylacetamide, hexamethylphosphoamide or a halogenated hydrocarbon.

In a process for forming a water-insoluble chitosan coating with the composition according to the present invention, heating of a coated or impregnated material at high temperature is not needed, and the water insolubilization of chitosan proceeds at from low temperature to room temperature. By eliminating the solvent contained in the composition as needed after the composition is applied to the surface and/or inside of a base material, chitosan is solidified or water-insolubilized so that a base material coated with the water-insolubilized chitosan or containing the water-insolubilized chitosan (composite material) can be obtained. It is to be noted that heating may of course be conducted upon the above-described water insolubilization as needed The mechanism of the solidification or water insolubilization of chitosan has not been elucidated. Presumably, however, the water insolubilization appears to be achieved through a reaction between the amino groups of chitosan and the highly-reactive aldehyde group of glyoxylic acid contained in the composition according to the present invention.

For the above-described water insolubilization of chitosan, insolubilization conditions (for example, temperature and time) can be selectively determined depending on the components contained in the composition according to the present invention or the heat sensitivity of the base material. When the composition according to the present invention is applied to a base material containing a heat-sensitive compound as in a heat-sensitive printing sheet, it is only necessary to apply or impregnate and dry the composition, for example, at temperatures not higher than 50° C. When the solvent is subsequently removed from the coated or impregnated material, a method such as low-temperature or reduced-pressure drying can also be used. When a base material having heat resistance to 100° C. or higher is treated with the composition according to the present invention, on the other hand, drying can be conducted at a temperature of 100° C. or higher. To further enhance the characteristic suppression of the yellowing of a treated base material by the present invention, it is preferred to conduct the water insolubilization treatment at a temperature of from 0° C. to 50° C.

For the evaluation of properties of each composition according to the present invention as a solidified matter or water-insolubilized matter, the solidified matter or water-insolubilized matter was evaluated for waterproofness and pot life property by holding it in a constant-temperature chamber. In addition, concerning each solution-containing gel prepared by adding a fragrance to the composition according to the present invention, its aroma was checked with time to ascertain the sustained release property of the solution from the solution-containing gel.

The solution-containing gel, which has been obtained by solidifying or water-insolubilizing the composition according to the present invention at from a low temperature to room temperature and is composed of the composition according to the present invention, and the base material (composite material), which has been obtained by applying the composition to the surface and/or inside of the base material and then solidifying or water-insolubilizing the composition, have antibacterial activities inherent to chitosan, because chitosan contains all of primary, secondary and tertiary amino groups or quaternary ammonium groups and carboxyl groups. In the case of inkjet recording paper or the like, the reactivity between the chitosan in the recording paper and the dye (s) in ink (s) is good so that the recorded paper is provided with excellent waterproofness.

As applications making good use of the above-described properties of the composition according to the present invention, base materials to be treated with the composition according to the present invention can be, for example, platy, foil-shaped, spongy, fibrous or three-dimensional, formed products. As their materials, metals, glass, ceramics, concrete, paper, resins, wood, organic polymers or inorganic polymers can be mentioned. In particular, the water insolubilization of chitosan in the composition according to the present invention can be effected at a low temperature without needing high-temperature treatment, and moreover, has low staining property. Therefore, the composition according to the present invention is useful, for example, for the treatment of printing sheets such as paper or films, more specifically inkjet recording paper.

EXAMPLES

The present invention will next be described more specifically based on Examples and Comparative Examples. It is, however, to be noted that the present invention shall not be limited by these Examples. The designations "part", "parts" and "%" as used herein are on a weight basis unless otherwise specifically indicated. The formulas of compositions employed as examples are shown in Table 1, and their preparation procedure will be described hereinafter.

Example 1

After chitosan (weight average molecular weight: 80,000, deacetylation degree: 85%; 10 parts) was dispersed in deionized water (80 parts), a 50% aqueous solution of glyoxylic acid (10 parts) was added. The resultant mixture was stirred at room temperature for 4 hours into a solution to obtain a composition according to the present invention.

Examples 2-12

By a similar procedure as in Example 1, compositions were prepared by changing the kind, molecular weight, deacetylation degree (DAC) and amount of chitosan (Component A) and the kind and amount of glyoxylic acid (Component B), an acidic component (Component C) and a solvent (Component D) other than water as shown in Table 1.

Comparative Examples

The formulas of compositions used as comparative examples are shown in Table 1, and their preparation procedure will be described hereinafter.

Comparative Example 1

After chitosan (weight average molecular weight: 80,000, deacetylation degree: 85%; 10 parts) was dispersed in deionized water (85 parts), acetic acid (5 parts) was added. The resultant mixture was stirred at room temperature for 4 hours into a solution to obtain a composition of Comparative Example 1.

Comparative Example 2

After chitosan (weight average molecular weight: 80,000, deacetylation degree: 85%; 10 parts) was dispersed in deionized water (85 parts), lactic acid (5 parts) was added. The resultant mixture was stirred at room temperature for 4 hours into a solution. A 40% aqueous solution of glyoxal (5 parts) was then mixed under stirring to obtain a composition of Comparative Example 2.

Comparative Example 3

After chitosan (weight average molecular weight: 80,000, deacetylation degree: 85%; 10 parts) was dispersed in deionized water (85 parts), lactic acid (5 parts) was added. The resultant mixture was stirred at room temperature for 4 hours into a solution. A block isocyanate ("ELASTRON BAP", product of Daiichi Kogyo Seiyaku Co., Ltd.; 60 parts) was then mixed under stirring to obtain a composition of Comparative Example 3.

Using the compositions prepared in accordance with the formulas shown in Table 1, coatings were obtained by the below-described coating-forming procedure. Their waterproofness evaluation test and pot life evaluation test were conducted. The evaluation results are shown in Table 2.

Coating-Forming Procedure and Waterproofness Evaluation Method

The compositions (5 g) of Examples 1-12 and Comparative Examples 1-3 were poured into glass Petri dishes of 9 cm in diameter, respectively, to provide two glass Petri dishes per solution. Coatings were formed by subjecting the solution in one of the two glass Petri dishes to heated drying at 120° C. for 1 hour and subjecting the solution in the other glass Petri dish to room-temperature drying at room temperature for 1 week, respectively. Subsequent to the formation of the coatings, water (80 mL) of 40° C. was poured into each glass Petri dish, and the glass Petri dish was allowed to stand in a constant-temperature chamber of 40° C. At every $8^{th}$ hour and twice in total, the water of 40° C. was renewed. The conditions of the coating after 24 hours were observed to evaluate its waterproofness. The evaluation was performed in accordance with the following standards.

TABLE 1

| | Compositions | | | | | |
|---|---|---|---|---|---|---|
| | Component A | | | | Component B | |
| | Kind | Molecular weight | DAC | Added amount | Kind | Added amount |
| Ex. 1 | Chitosan | 80,000 | 85% | 10 parts | 50% GOW | 10 parts |
| Ex. 2 | Chitosan | 50,000 | 94% | 10 parts | GOMH | 5 parts |
| Ex. 3 | Chitosan | 10,000 | 98% | 20 parts | GOMH | 5 parts |
| Ex. 4 | Chitosan | 720,000 | 83% | 1 parts | 50% GOW | 2 parts |
| Ex. 5 | Chitosan | 130,000 | 85% | 5 parts | 50% GOW | 5 parts |
| Ex. 6 | Chitosan | 130,000 | 85% | 5 parts | GOMH | 4 parts |
| Ex. 7 | Chitosan | 50,000 | 94% | 2 parts | GOMH | 3 parts |
| Ex. 8 | Glycerylated chitosan | 100,000 | 85% | 10 parts | GOMH | 5 parts |
| Ex. 9 | Glycerylated chitosan | 100,000 | 94% | 10 parts | GOMH | 5 parts |
| Ex. 10 | Cationized chitosan | 120,000 | 98% | 5 parts | 50% GOW | 5 parts |
| Ex. 11 | Hydroxypropylchitosan | 90,000 | 85% | 5 parts | 50% GOW | 5 parts |
| Ex. 12 | Hydroxybutylchitosan | 110,000 | 85% | 5 parts | 50% GOW | 5 parts |
| Comp. Ex. 1 | Chitosan | 80,000 | 85% | 10 parts | — | — |
| Comp. Ex. 2 | Chitosan | 80,000 | 85% | 10 parts | — | — |
| Comp. Ex. 3 | Chitosan | 80,000 | 85% | 10 parts | — | — |

| | Component C | | Component D | | Component E | | Water |
|---|---|---|---|---|---|---|---|
| Example/ Comp. Ex. | Kind | Added amount | Kind | Added amount | Kind | Added amount | Added amount |
| Ex. 1 | — | — | — | — | — | — | 80 parts |
| Ex. 2 | Lactic acid | 5 parts | — | — | — | — | 80 parts |
| Ex. 3 | Acetic acid | 10 parts | — | — | — | — | 65 parts |
| Ex. 4 | — | — | — | — | — | — | 97 parts |
| Ex. 5 | — | — | IPA | 10 parts | — | — | 80 parts |
| Ex. 6 | Lactic acid | 1 parts | Ethanol | 5 parts | — | — | 85 parts |
| Ex. 7 | — | — | Methanol | 20 parts | — | — | 75 parts |
| Ex. 8 | — | — | IPA | 40 parts | — | — | 45 parts |
| Ex. 9 | Citric acid | 3 parts | — | — | — | — | 82 parts |
| Ex. 10 | — | — | NMP | 5 parts | — | — | 85 parts |
| Ex. 11 | — | — | — | — | — | — | 90 parts |
| Ex. 12 | — | — | — | — | — | — | 90 parts |
| Comp. Ex. 1 | Acetic acid | 5 parts | — | — | — | — | 85 parts |
| Comp. Ex. 2 | Lactic acid | 5 parts | — | — | Crosslinking agent A | 5 parts | 85 parts |
| Comp. Ex. 3 | Lactic acid | 5 parts | — | — | Crosslinking agent B | 60 parts | 85 parts |

Component A: Chitosan or the like DAC: Deacetylation degree
Component B: Glyoxylic acid 50% GOW: 50% aqueous solution of glyoxylic acid GOMH: glyoxylic acid monohydrate
Component C: Acidic component
Component D: Solvent other than water IPA: Isopropyl alcohol NMP: N-methyl-2-pyrrolidone
Component E: Crosslinking agent Crosslinking agent A: 40% aqueous solution of glyoxal Crosslinking agent B: "ELASTRON" (product of Daiichi Kogyo Seiyaku Co., Ltd.)

Evaluation Standards for Waterproofness

A: Insoluble, and swollen only a little.
B: Insoluble, but swollen.
C: Dissolved or crumbled at some parts.
D: Wholly dissolved or substantially dissolved.
Pot Life Evaluation Method The compositions (30 g) of Examples 1-12 and Comparative Examples 1-3 were separately placed in 50-cc sample bottles, and tight closures were applied. They were allowed to stand for the respective periods shown in Table 2 in a temperature-constant chamber controlled at 25° C., and changes in the state of each solution were observed and evaluated. The evaluation was performed in accordance with the following standards.
Evaluation Standards for Pot Life
A: Stable state as a solution remained without a viscosity increase.
B: Viscosity increased, and fluidity lowered.
C: Gelled, and had no fluidity.

anate compound as a crosslinking agent. The pot life was good, but no coating waterproofness was available unless subjected to heated drying.

Application Example 1

After a water-soluble fragrance (0.1 g) was added to the composition of Example 1 and the resultant mixture was mixed for 30 minutes under stirring, the mixture was transferred into a tightly closable vessel, and was allowed to stand in a constant-temperature chamber controlled at 60° C. When the vessel was taken out of the constant-temperature chamber 24 hours later, a solution-containing gel was obtained with the whole solution gelled in an agar-like form. The closure was removed, and the vessel was left over in the room. The aroma of the fragrance in the resultant water-containing gel persisted even upon an elapsed time of 1 month or longer, and therefore, the water-containing gel was effective as a gel-like carrier for sustained release.

TABLE 2

Coating Waterproofness Evaluation and Pot Life Evaluation

| Example/ Comp. Ex. | Evaluation test of coating | | Pot life (storage life) | | | | | |
|---|---|---|---|---|---|---|---|---|
| | Coating formed by heated drying | Coating formed by room-temperature drying | 1 hour | 1 day | 4 days | 1 week | 2 weeks | 1 month |
| Ex. 1 | A | B | A | A | A | A | B | C |
| Ex. 2 | B | B | A | A | A | A | A | B |
| Ex. 3 | B | B | A | A | A | B | C | C |
| Ex. 4 | A | A | A | A | A | A | A | A |
| Ex. 5 | A | A | A | A | A | A | A | A |
| Ex. 6 | A | A | A | A | A | A | A | B |
| Ex. 7 | A | B | A | A | A | A | A | A |
| Ex. 8 | A | B | A | A | A | A | A | A |
| Ex. 9 | A | B | A | A | A | A | A | A |
| Ex. 10 | A | B | A | A | A | A | A | A |
| Ex. 11 | A | B | A | A | A | A | A | A |
| Ex. 12 | A | B | A | A | A | A | A | A |
| Comp. Ex. 1 | D | D | A | A | A | A | A | A |
| Comp. Ex. 2 | A | A | C | C | C | C | C | C |
| Comp. Ex. 3 | A | D | A | A | A | A | A | A |

From the waterproofness evaluation results and pot life evaluation results shown in Table 2, it is recognized that the coatings obtained from the compositions of the present invention have sufficient waterproofness even when obtained by drying the coatings at room temperature, and that the compositions also have pot life of 1 week or longer as a "single-pack". Examples 1-4 all gave good results although the chitosan samples having various molecular weights were used. Examples 5-7 showed sufficient waterproofness and pot life although the solvent was changed to the water-containing alcohols. Examples 8-12 all gave good results although various kinds of the chitosan derivatives were used.

Comparative Example 1 is directed to a simple aqueous solution of chitosan in acetic acid, in which no crosslinking agent was added. Even the coating formed by heated drying, to say nothing of the coating formed by room-temperature drying, did not have waterproofness and was dissolved. Comparative Example 2 is directed to the use of glyoxal as a crosslinking agent, and the waterproofness of the coating was good even when the coating was obtained by room-temperature drying. However, the pot life was extremely short. Comparative Example 3 is directed to the use of the block isocy-

Application Example 2

On to the surface of an aluminum plate which had been subjected to degreasing treatment with a 0.1 N aqueous solution of sodium hydroxide, the composition of Example 1 was coated by a bar coater (No. 6). The coated aluminum plate was left over and dried at room temperature for 1 week to prepare a treated plate. When the adherence of the coating was checked by "SELLOTAPE"™ peeling test, no peeling of the coating was observed and the adhesion between the coating and the base material was good. Further, the above-obtained treated plate was immersed for 24 hours in water and was then observed. The coating was free from separation. The coating was dried in air, and its weight was measured. From the weights of the coating before and after the immersion in water, the percent remainder of the coating was calculated. As a result, the percent remainder of the coating was found to be substantially 100%.

Application Example 3

The compositions of Example 1 and Comparative Example 2 were separately coated at a rate of 5 g/cm² in terms of solid content onto wood-free paper by a bar coater. After drying at 50° C., heat setting was conducted for 5 hours in a fan dryer of 120° C. to accelerate the coloration of the coatings. Subsequently, the degrees of coloration of the coatings were compared by the naked eye. The coating formed from the composition of Comparative Example 2 was stained in a yellowish brown color, while the coating formed from the composition of Example 1 was in a slightly yellow color and hence was stained less so that the degree of yellowing was significantly suppressed compared with the coating crosslinked with glyoxal.

INDUSTRIAL APPLICABILITY

The present invention can provide a composition excellent in pot life as a "single pack" and capable of forming a water-insolubilized chitosan coating even by room-temperature coating, without needing high-temperature heating, after the composition is once coated on a base material, a solution-containing gel formed from the composition, a water-insoluble chitosan coating; and a material obtained by treating a base material with the composition.

The invention claimed is:

1. A water-insoluble and coloration-suppressed chitosan aqueous solution composition, the aqueous solution composition consisting of:
   a polysaccharide consisting of a material selected from the group consisting of N-acetylglucosamine, glucosamine, and a combination thereof;
   glyoxylic acid; and
   an aqueous medium, which is water or a mixture of water and a water-soluble organic solvent,
   wherein a content of said polysaccharide in the aqueous solution composition is in a range from 0.1 to 30 wt %, and
   a content ratio by weight of the glyoxylic acid relative to the polysaccharide in the aqueous solution composition is in a range from 0.8 to 3.

2. A water-insoluble and coloration-suppressed chitosan coating, the coating consisting of:
   a polysaccharide that consists of N-acetylglucosamine and glucosamine in combination or that consists of glucosamine; and
   glyoxylic acid,
   wherein the coating is obtained by drying the water-insoluble and coloration-suppressed chitosan aqueous solution composition according to claim 1, at a temperature in a range from 0° C. to 50° C.

3. A composite material comprising:
   a heat-sensitive printing sheet or an inkjet recording paper; and
   a water-insoluble and coloration-suppressed chitosan coating formed on the heat-sensitive printing sheet or the inkjet recording paper,
   wherein the water-insoluble and coloration-suppressed chitosan coating is formed on the heat-sensitive printing sheet or the inkjet recording paper by drying the water-insoluble and coloration-suppressed chitosan aqueous solution composition according to claim 1, at a temperature in a range from 0° C. to 50° C.

4. A method for producing the composite material according to claim 3, comprising steps of:
   applying the aqueous solution composition to the heat-sensitive printing sheet or the inkjet recording paper, or impregnating the heat-sensitive printing sheet or the inkjet recording paper with the aqueous solution composition, and then
   drying at the temperature in the range from 0° C. to 50° C., so as to water-insolubilize said polysaccharide.

* * * * *